April 4, 1950            L. MORTON            2,503,124
ELECTRIC IRON CORD SUPPORT
Filed Nov. 14, 1946
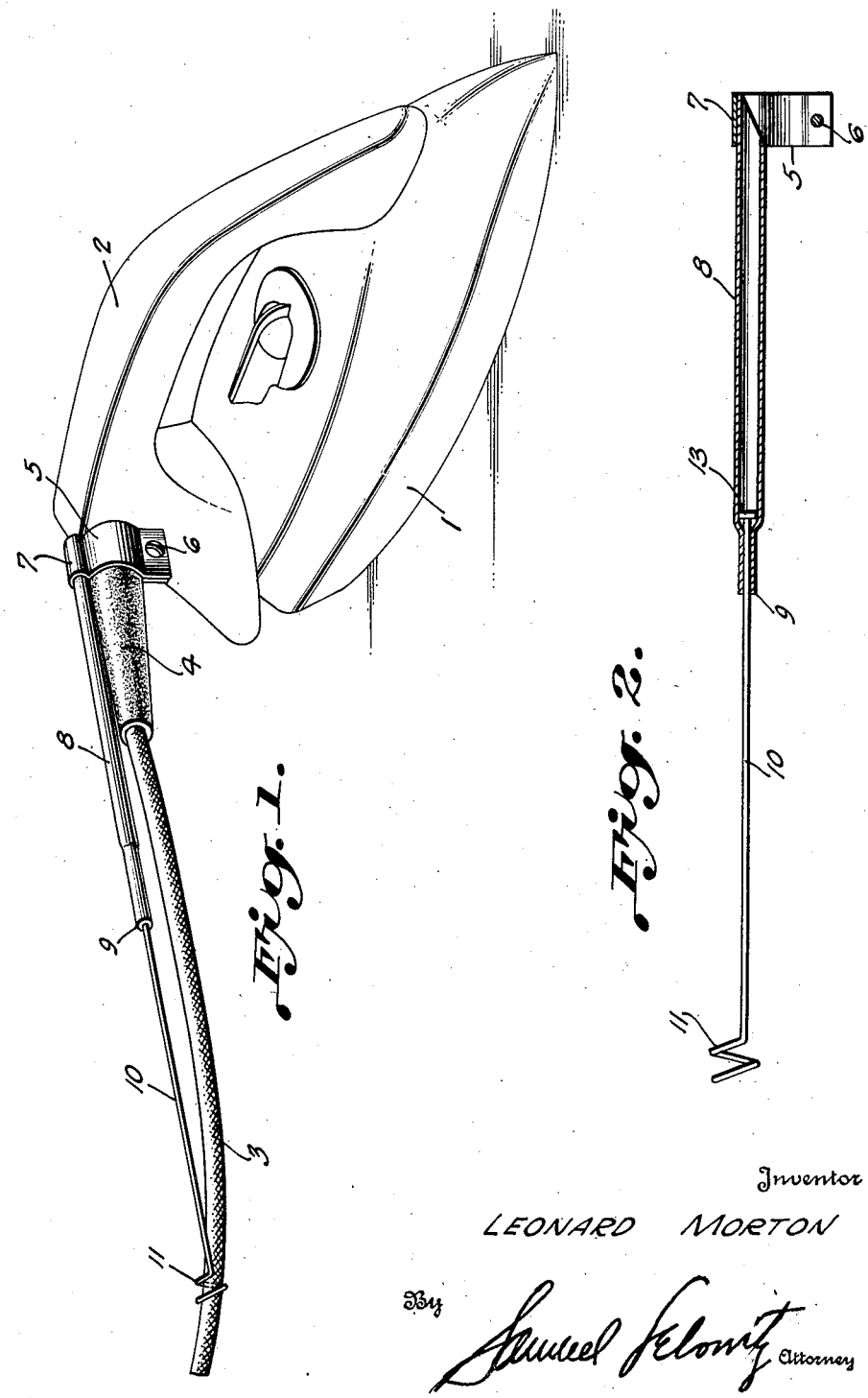
Inventor
LEONARD MORTON
By *Samuel Selowitz*, Attorney Patented Apr. 4, 1950

2,503,124

UNITED STATES PATENT OFFICE 2,503,124

ELECTRIC IRON CORD SUPPORT

Leonard Morton, Rochester, N. Y.

Application November 14, 1946, Serial No. 709,845

1 Claim. (Cl. 248—52)

This invention relates to a support for the flexible cord for an electric iron which is attached to the body of the iron and which serves to maintain the cord clear of the underside of the iron while permitting the free movement of the latter in the course of the ironing operations.

It is the object of the present invention to provide a cord support for an electric iron which is rugged and economical in construction and which may be attached easily to the iron to maintain the electric cord in the desired position relative to the iron and which offers no impediment to the ironing movements encountered in the ironing operations.

It is a further object of the invention to provide a light and compact guiding and restraining member for the electric cord of an electric iron which may be conveniently attached to the cord guard extending from the handle of the iron, or other part thereof. This guiding and restraining member is formed of at least two telescopically arranged parts which permits the cord to assume different positions with respect to the iron as the latter moves about.

Other objects and purposes will appear from the detailed description of the invention following hereinafter, taken in conjunction with the accompanying drawing, wherein Fig. 1 is a perspective view of the invention as the same is applied to an electric iron; and Fig. 2 is a longitudinal sectional view with certain parts in elevation of the support for the flexible cord in accordance with the present invention.

In Fig. 1 is shown an electric iron 1 provided with a handle 2, which is energized through the flexible electric supply cord 3 from an electrical outlet and which is connected to the heating elements in the electric iron in known manner. A cord guard formed of rubber is mounted on the handle 2 to reduce the bending stresses of the cord at the junction point thereof with the iron.

The cord support in accordance with the present invention is formed by at least two relatively telescopic members, which have been shown as consisting of a cylindrical tube 8 and a wire 10 fitting therein for freely sliding and rotating movement. A U-shaped clamp 5 is mounted at one end of the hollow cylindrical rod 8 which is engaged by sleeve 7 of the clamp. The clamp 5 is adapted to be attached to the base of the rubber guard 4 by means of a screw or bolt and nut assembly 6. The wire 10 extends from the opposite end 9 of the tube 8 and this wire is provided with an enlarged head 13 to prevent a complete disengagement of the wire 10 from the cylinder 8. A loop 11 is formed on the extremity of the wire 10 to form a guide or clamp for the flexible cord 3. The telescopic relationship between the juxtaposed ends of members 8 and 10 permit the loop 11 to approach towards and recede from the clamp 5, whereupon the flexible cord may be disposed in extended position upon the side of the electric iron, or may be formed with a bight therein upon the movement of the loop 11 inwardly towards the end 9. In some instances when no sharp turns are formed in the cord adjacent to the loop 11, the latter forms a simple guide for the travel therein of a portion of the cord 3 for a limited extent. In no case can the cord extend to the underside of the electric iron by virtue of the retention of the cord support laterally of the handle body.

The cord support, consisting of the telescopic members 8 and 10 and the clamps at the terminals thereof, are preferably formed of steel tubing and spring steel wire, but any other metals or plastics can be used. In view of the fact that the overall length of the unit is about 7½" in extended condition, the same is extremely light and offers no additional burden in the course of the ironing process. The loop 11 permits a convenient disengagement from the cord at any times when such is desired and in the idle position of the iron, the steel wire 10 may be held in collapsed condition so that the supporting unit is no more than 4" in length, which renders the iron assembly nearly as compact as it is without the cord support.

The cord support may be detached readily from the iron for use upon any other guard such as a wire guard on the well-known attachment plugs for electric irons. It takes up but little room in either its operative or inoperative position and because of the many advantages accruing therefrom, it constitutes a highly desirable household item.

While I have described my invention as embodied in a specific form and as operating in a specific manner for purposes of illustration, it should be understood that I do not limit my invention thereto, since various modifications will suggest themselves to those skilled in the art without departing from the spirit of my invention, the scope of which is set forth in the annexed claim.

I claim:

A support for the flexible cord of an electric iron extending from a guard therefor at said electric iron comprising a hollow cylindrical rod having a clamp at one end thereof for attachment to said guard, a cylindrical wire fitting within said rod and extending coaxially thereto from the opposite end thereof in freely movable telescopic and rotatable relation thereto, and a loop at the remote end of said wire for engaging the flexible cord so that the cord may move freely without hindering the movements of the iron.

LEONARD MORTON.

REFERENCES CITED

The following references are of record in the file of this patent:

UNITED STATES PATENTS

| Number | Name | Date |
|---|---|---|
| 1,516,781 | Nylen | Nov. 25, 1924 |
| 1,533,412 | Herron | Apr. 14, 1925 |
| 1,759,417 | Rabsilber | May 20, 1930 |
| 1,787,252 | Jones | Dec. 30, 1930 |
| 2,079,759 | Burns | May 11, 1937 |
| 2,205,139 | Gunderson | June 18, 1940 |

FOREIGN PATENTS

| Number | Country | Date |
|---|---|---|
| 414,251 | Germany | June 2, 1925 |